(12) United States Patent
Park et al.

(10) Patent No.: US 8,254,103 B2
(45) Date of Patent: Aug. 28, 2012

(54) HINGE UNIT AND PORTABLE COMPUTER HAVING THE SAME

(75) Inventors: Young-sun Park, Gyeonggi-do (KR); Eduard Kurgi, Petrozavodsk (RU); Jung-hyeon Kim, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 191 days.

(21) Appl. No.: 12/858,568

(22) Filed: Aug. 18, 2010

(65) Prior Publication Data

US 2011/0085289 A1 Apr. 14, 2011

(30) Foreign Application Priority Data

Oct. 12, 2009 (KR) .......................... 10-2009-0096901

(51) Int. Cl.
*G06F 1/16* (2006.01)

(52) U.S. Cl. ................ 361/679.27; 360/130.24; 16/250; 248/284.1

(58) Field of Classification Search ............... 16/340, 16/342, 386, 366, 382, 49, 250; 360/265.2, 360/265.7, 99.02, 130.24; 361/679.27, 679.56, 361/679.28, 679.26, 679.55, 679.41, 679.4, 361/679.53, 679.48, 679.02, 679.3, 801; 254/8 B, 133 R, 369; 297/362, 300.3, 300.8; 248/122.1, 125.7, 124.1, 917, 284.1

See application file for complete search history.

(56) References Cited

U.S. PATENT DOCUMENTS 5,239,731 A * 8/1993 Lu ................................... 16/340
8,141,206 B2 * 3/2012 Chen et al. ....................... 16/342

FOREIGN PATENT DOCUMENTS

JP 2003-161311 6/2003

* cited by examiner

*Primary Examiner* — Hung Duong
(74) *Attorney, Agent, or Firm* — Cha & Reiter, LLC

(57) ABSTRACT

Disclosed are a hinge unit which couples a first member and a second member, the hinge unit including: a conic shaft which is coupled to the first member, and comprises a hinge pivot, a conic unit of a truncated cone shape, the radius of which is extended in an end area of the hinge pivot, and a first rocking unit formed to an outer surface of the conic unit; and a conic sleeve which is coupled to the second member, and comprises a sleeve main body formed with a conic accommodating unit having a shape corresponding to the conic unit in an inner part of the conic accommodating unit, and a second rocking unit formed to an inner surface of the conic accommodating unit to be coupled with the first rocking unit.

20 Claims, 8 Drawing Sheets

HINGE UNIT AND PORTABLE COMPUTER HAVING THE SAME

CLAIM OF PRIORITY

This application claims, under 35 USC 119(a), priority to and the benefit of the earlier filing date of, that Korean Patent Application entitled "Hinge Unit and Portable Computer having the Same, filed on Oct. 12, 2009 in the Korean Intellectual Property Office and afforded Ser. No. 10-2009-0096901, the contents of which is incorporated by reference, herein.

BACKGROUND OF THE INVENTION

1. Field of the Invention

This application relates to the field of computer casings and more particularly to a hinge unit of a portable computer which reduces the number of components and consequently in reduced manufacturing cost and improved abrasion resistance.

2. Description of the Related Art

In general, a display unit of a portable computer is coupled to a computer main body by a hinge unit. An example of this hinge unit of the portable computer is disclosed in Japanese Patent First Publication No. 2003-161311.

As shown in FIGS. 1 and 2, (which are comparable to FIGS. 2 and 3 of the aforementioned '311 application) a hinge unit 1 includes a hinge pivot 10, a first connecting body 20 coupled to a display unit, a second connecting body 30 coupled to a computer main body unit, a pair of a first cam member 40 and second cam member 50 coupled respectively to the first connecting body 20 and the second connecting body 30 and having inclination surfaces 45 and 55 (see FIG. 2) formed on facing surfaces of cam members 40, 50, respectively. Also illustrated is a spring 50 pressing the first cam member 40 to the second cam member 50 along an axially direction of the hinge pivot 10, etc. The first cam member 40 and the second cam member 50 are locked to and withdrawn from each other depending on a relative rotation of surfaces 45 and 55

However, since the inclination surfaces 45 and 55 of the first cam member 40 and the second cam member 50 of the conventional hinge unit 1 for a portable computer contact in the axis direction of the hinge pivot 10 and receive the pressing force of the spring 60 in a vertical direction, the friction force is seriously applied depending on the relative rotation to easily cause abrasion. Also, since components configuring the hinge unit 1 are many, the manufacturing cost increases.

SUMMARY OF THE INVENTION

Accordingly, one or more exemplary embodiments of the invention provide a hinge unit containing a reduced number of components that provides for reduced manufacturing costs and improved an abrasion resistance.

Still another exemplary embodiment is to provide a portable computer including a hinge unit having a reduced number of components that reduces manufacturing costs and improves abrasion resistance.

The foregoing description of the invention and/or other aspects may be achieved by providing a hinge unit which couples a first member and a second member, the hinge unit including: a conic shaft which is coupled to the first member, and comprises a hinge pivot, a conic unit of a truncated cone shape, the radius of which is extended in an end area of the hinge pivot, and a first rocking unit (i.e., a first engagement means) formed on an outer surface of the conic unit; and a conic sleeve which is coupled to the second member, and comprises a sleeve main body formed with a conic accommodating unit having a shape corresponding to the conic unit in an inner part the conic accommodating unit, and a second rocking unit (i.e., a second engagement means) formed on an inner surface of the conic accommodating unit to be coupled with the first rocking unit.

The first rocking unit may be provided as a rocking protrusion protruding from an outer surface of the conic unit, and the second rocking unit may be provided as a protrusion accommodating unit formed to an inner surface of the conic accommodating unit to accommodate the rocking protrusion.

The second rocking unit may be provided as a rocking protrusion protruding from an inner surface of the conic accommodating unit, and the first rocking unit may be provided as a protrusion accommodating unit formed to an outer surface of the conic unit to accommodate the rocking protrusion.

The rocking protrusion and the protrusion accommodating unit may be formed along an axial direction of the hinge pivot.

The rocking protrusion and the protrusion accommodating unit may have a spiral shape along the axial direction of the hinge pivot.

The hinge unit may further include an elastic member which is disposed to the hinge pivot, and elastically presses the conic sleeve toward the conic shaft.

The rocking protrusion may have an angle of the range of 5 to 45 degrees with respect to the axial direction of the hinge pivot.

The rocking protrusion and the protrusion accommodating unit may be provided in plural along a radius direction of the hinge pivot.

At least one of the rocking protrusion and the protrusion accommodating unit may be formed with an inclination surface along a transverse direction to a lengthwise direction thereof.

The hinge pivot, the conic unit and the first rocking unit may be integrally formed.

According to another aspect, there is provided a portable computer which may include a computer main body unit, a display unit, and a hinge unit coupling the display unit to the computer main body unit, the hinge unit including: a conic shaft which is coupled to one of the computer main body unit and the display unit, and includes a hinge pivot, a conic unit of a truncated cone shape, the radius of which is extended in an end area of the hinge pivot, and a first rocking unit formed to an outer surface of the conic unit; and a conic sleeve which is coupled to the other of the computer main body unit and the display unit, and includes a conic accommodating unit having a shape corresponding to the conic unit, and a second rocking unit formed to an inner surface of the conic accommodating unit to be coupled with the first rocking unit.

The first rocking unit may be provided as a rocking protrusion protruding from an outer surface of the conic unit, and the second rocking unit may be provided as a protrusion accommodating unit formed to an inner surface of the conic accommodating unit to accommodate the rocking protrusion.

The second rocking unit may be provided as a rocking protrusion protruding from an inner surface of the conic accommodating unit, and the first rocking unit may be provided as a protrusion accommodating unit formed to an outer surface of the conic unit to accommodate the rocking protrusion.

The rocking protrusion and the protrusion accommodating unit may be formed along an axial direction of the hinge pivot.

The rocking protrusion and the protrusion accommodating unit may have a spiral shape along the axial direction of the hinge pivot.

The portable computer may further include an elastic member which is disposed to the hinge pivot, and elastically presses the conic sleeve toward the conic shaft.

The rocking protrusion may have an angle in the range of 5 to 45 degrees with respect to the axial direction of the hinge pivot.

The rocking protrusion and the protrusion accommodating unit may be provided in plural along a radius direction of the hinge pivot.

At least one of the rocking protrusion and the protrusion accommodating unit may be formed with an inclination surface along a transverse direction to a lengthwise direction thereof.

The hinge pivot, the conic unit and the first rocking unit may be integrally formed.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE INVENTION

Figure 1:
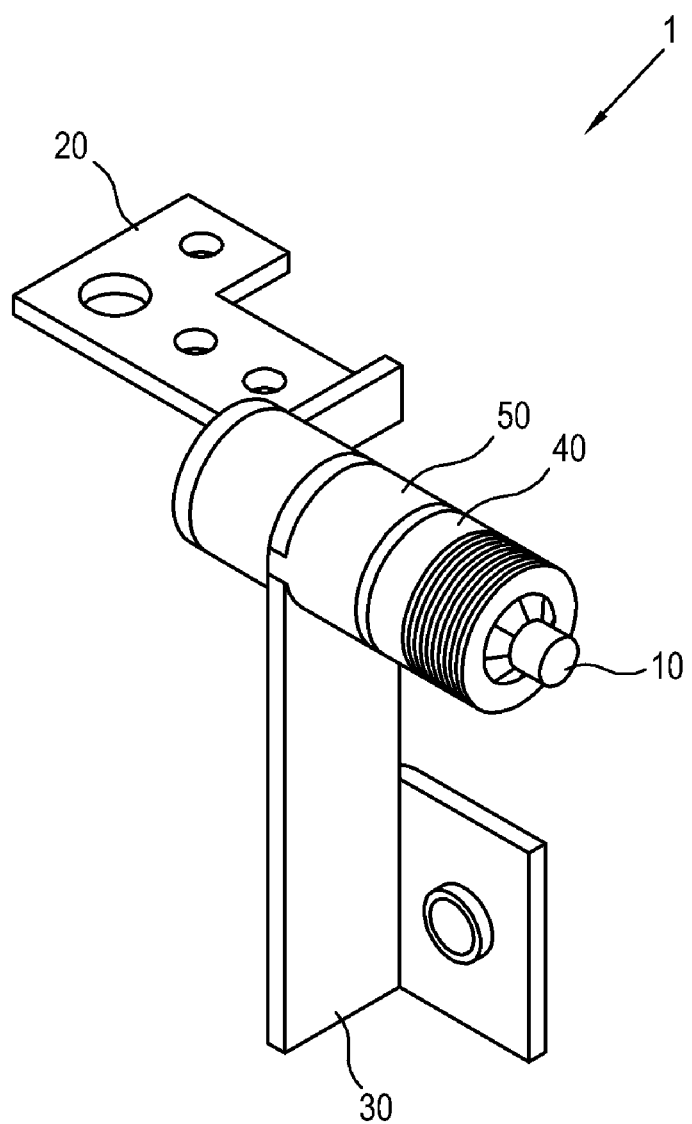
FIGS. 1 and 2 are a perspective view and an exploded perspective view of a conventional hinge unit.
Figure 2:
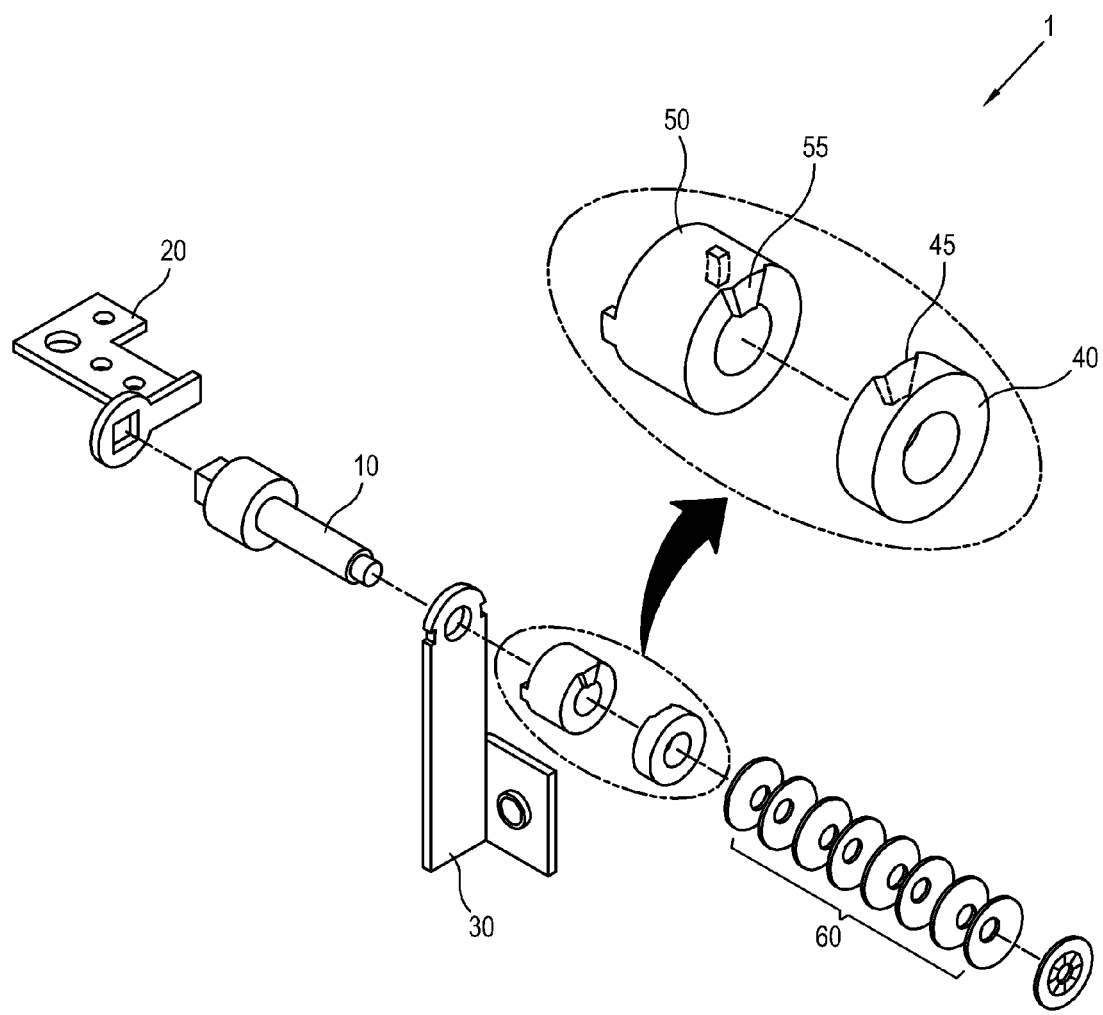

Exemplary embodiments will be described in detail with reference to accompanying drawings so as to be easily realized and implemented by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Hereinafter, a hinge unit 200 and a portable computer 100 containing the hinge unit 200 according to a preferable exemplary embodiment are described in detail by referring to FIGS. 3 to 7. In the present exemplary embodiment, the hinge unit 200 is exemplarily described to be applied to the portable computer 100, but is not defined thereof. That is, the hinge unit 200 according to the present exemplary embodiment may be applied to other types of devices and apparatuses in which a first member and a second member are relatively rotated such as a generally widely used rotation open and close type door, an electronic product such as a refrigerator, an oven, etc., and various furniture.

Figure 3:
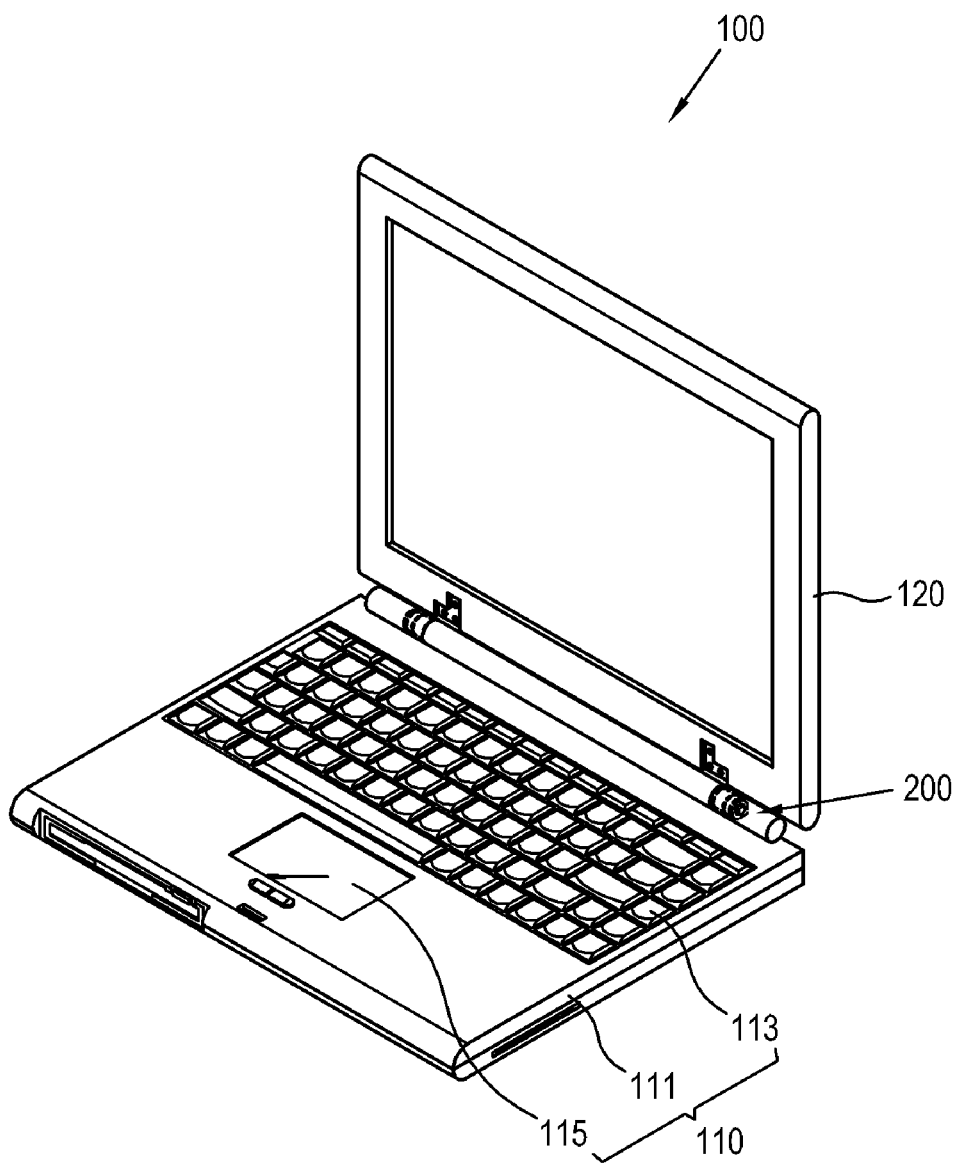
FIG. 3 is a perspective view illustrating a schematic configuration of a portable computer according to an exemplary embodiment.
Figure 4:
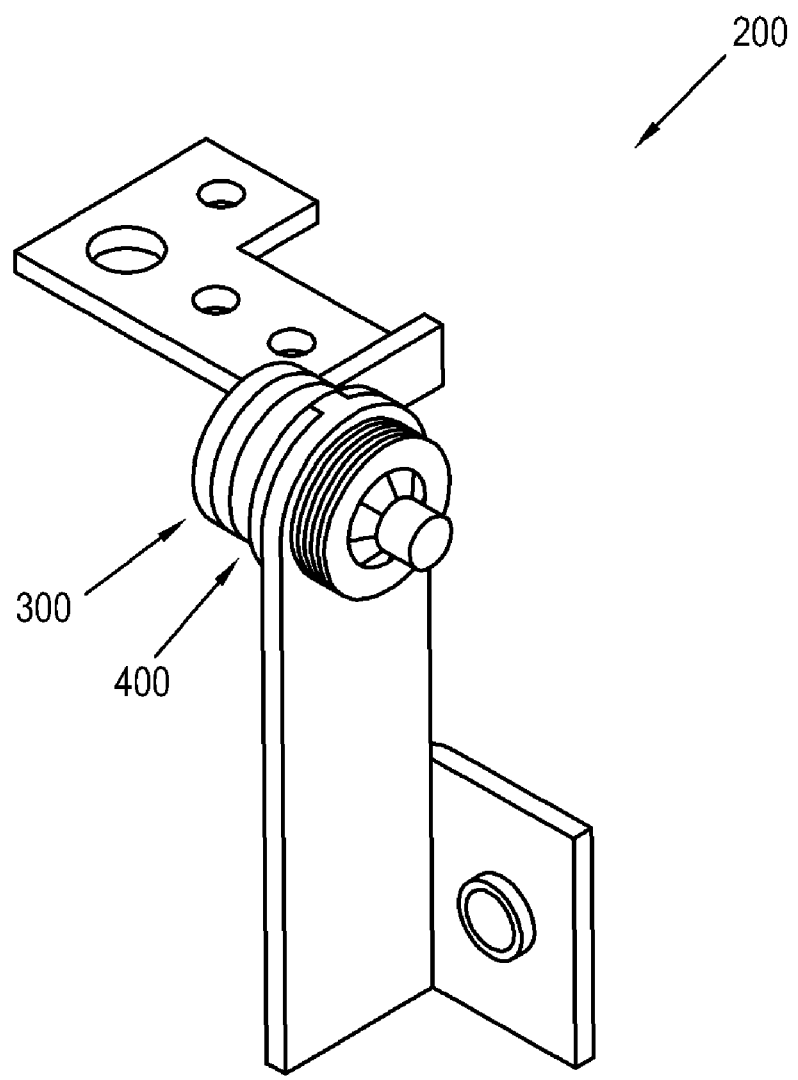
FIGS. 4 and 5 are a perspective view and an exploded perspective view of a hinge unit according to an exemplary embodiment.

Referring to FIG. 3, the portable computer 100 according to the present exemplary embodiment includes a computer main body unit 110, a display unit 120 and a hinge unit 200.

The computer main body unit 110 includes a main body casing 111 of a planar shape having a predetermined thickness to form an appearance, a key board 113 and a touch pad 115 provided to an upper side of the main body casing 111 to input data, etc., and a central processing device (not shown), a main board (not shown), various option boards (not shown), etc. accommodated inside the main body casing 111 to process data.

The display unit 120 displays an image output from the computer main body unit 110. The display unit 120 is provided as a flat display panel such as a liquid crystal display (LCD), a plasma display panel (PDP), etc. The display unit 120 is coupled to the computer main body unit 110 by the hinge unit 200, which operates to rotate the display unit 120 into an open or a close position with respect to the computer main body unit 110.

The hinge unit 200 according to the present exemplary embodiment (see FIGS. 4 and 5) includes a conic shaft 300 coupled to one of the computer main body unit 110 and the display unit 120, and a conic sleeve 400 coupled to the other of the computer main body unit 110 and the display unit 120. In the present exemplary embodiment, it is exemplarily described that the conic shaft 300 is coupled to the computer main body unit 110 and the conic sleeve 400 is coupled to the display unit 120. However, it would be understood that this configuration is only for purposes of describing the invention claimed and that alternatively, the conic shaft 300 may be coupled to the display unit 120 and the conic sleeve 400 may be coupled to the computer main body unit 110.

The conic shaft 300 is coupled to the computer main body unit 110. The conic shaft 300 includes a hinge pivot 310, a conic unit 320 of a truncated cone shape, the radius of which is extended in an end area of the hinge pivot 310, and a first rocking unit 330 (i.e., a first engagement means) formed to an outer surface of the conic unit 320.

The hinge pivot 310 is a relative rotation axis line of the computer main body unit 110 and the display unit 120. The hinge pivot 310 is provided in a bar having a circular cross-sectional shape. The hinge pivot 310 is singly provided to have such a length as to cover the total area along a widthwise direction of the computer main body unit 110 and the display unit 120. However, the hinge pivot 310 may be provided in a pair to opposite areas along the widthwise direction of the computer main body unit 110 and the display unit 120. Also, the conic unit 320 is provided to an end area of the hinge pivot 310.

The conic unit 320 has a truncated cone shape, the radius of which is extended in an end area of the hinge pivot 310. The first rocking unit 330 is formed on an outer surface of the conic unit 320.

The first rocking unit 330 includes at least one rocking protrusion 333 protruding from the outer surface of the conic unit 320 along a radius direction of the conic unit 320.

The rocking protrusion 333 is formed along an axial direction of the hinge pivot 310 and has a length along the axial direction of the hinge pivot 310. The rocking protrusion 333, preferably, but not necessarily has a spiral shape along the axial direction of the hinge pivot 310, as illustrated.

The rocking protrusion 333 preferably but not necessarily has an angle θ of 5 to 45 degrees range with respect to the axial direction of the hinge pivot 310. Accordingly, durability of the rocking protrusion 333 and a protrusion accommodating unit 423 can be improved. In addition, the rocking protrusion 333 may have a rectilinear shape along the axial direction of the hinge pivot 310.

Although, the preferred implementation of the angle θ between the rocking protrusion 333 and the axial line of the hinge pivot 310 is in the order of 5 to 45 degrees range, it would be understood that the angle range may be increased or decreased without altering the scope of the invention.

The rocking protrusion 333 is preferably, but not necessarily, provided in plural along the radius direction of the hinge pivot 310. In the present exemplary embodiment, the rocking protrusion 333 is provided in a pair to be symmetrical with respect to the axial direction of the hinge pivot 310. However, the rocking protrusion 333 may be provided as a single element, and may be provided in equal to or more than three. If the rocking protrusion 333 is provided in plural, a plurality of rocking protrusions 333 are preferably but not necessarily disposed in parallel at a same interval. Accordingly, an operating force coupling the rocking protrusion 333 and the protrusion accommodating unit 423 is indiscriminately dispersed, thereby further improving the durability of the rocking protrusion 333 and the protrusion accommodating unit 423.

The rocking protrusion 333 is formed with an inclination surface 335 along a direction transverse to the lengthwise direction. Accordingly, the coupling operation of the rocking protrusion 333 and the protrusion accommodating unit 423 can be further smooth.

The hinge pivot 310, the conic unit 320 and the first rocking unit 330 are preferably but not necessarily formed integrally, but may be respectively provided by separate members to be coupled together.

The conic shaft 300 may be further attached to a first lever 340 coupling the conic unit 320 to the computer main body unit 110. The first lever 340 is coupled to the computer main body unit 110 by various coupling methods such as an insertion coupling, a screw coupling, a pin coupling, a rivet coupling, etc. Here, a coupling protrusion 325 protrudes from an outer end area of the conic unit 320 along the axial direction of the hinge pivot 310. The first lever 340 is formed with a protrusion insertion unit 345 to which the coupling protrusion 325 of the conic unit 320 is inserted. Thus, the first lever 340 is coupled to the conic shaft 300 by coupling of the coupling protrusion 325 and the protrusion insertion unit 345.

It is preferable but not necessary that the coupling protrusion 325 has a non-circular sectional shape to prevent the conic shaft 300 from rotating idly with respect to the first lever 340. Here, the protrusion insertion unit 345 has such a shape as to be coupled with the coupling protrusion 325 by a shape fitting coupling.

In the present exemplary embodiment, it is described that the coupling protrusion 325 is provided to the conic unit 320 and the protrusion insertion unit 345 is formed to the first lever 340. However, in an alternative embodiment (not shown) the coupling protrusion may be provided to the first lever 340, and the protrusion insertion unit may be formed to the conic unit 320.

Also, in the present exemplary embodiment, the conic shaft 300 and the first lever 340 are exemplarily described to be provided by separate members to be coupled together by the coupling of the coupling protrusion 325 and the protrusion insertion unit 345, but the present exemplary embodiment is not limited thereto and the conic shaft 300 and the first lever 340 may be integrally formed (not shown).

In the illustrated embodiment of the invention, the conic sleeve 400 is coupled to the display unit 120. The conic sleeve 400 has a sleeve main body 410 and a second rocking unit 420.

The sleeve main body 410 surrounds the conic unit 320. A conic accommodating unit 413 accommodating the conic unit 320 inside the main body 410 is formed through the sleeve main body 410. The conic accommodating unit 413 has a truncated cone shape corresponding to the conic unit 320 to be shape-fitting-coupled with the conic unit 320. An inner surface of the conic accommodating unit 413 is formed with a second rocking unit 420 that may be coupled with the first rocking unit 330.

The second rocking unit 420 is provided as the protrusion accommodating unit 423 recessed formed on an inner surface of the conic accommodating unit 413 along a radius direction of the conic accommodating unit 413.

The protrusion accommodating unit 423 has preferably but not necessarily a shape corresponding to the rocking protrusion 333. Here, the protrusion accommodating unit 423 is preferably but not necessary formed to be larger in comparison to the rocking protrusion 333 so that the rocking protrusion 333 can move while being accommodated within the protrusion accommodating unit 423.

The protrusion accommodating unit 423 is formed along the axial direction of the hinge pivot 310 in a manner similar to the rocking protrusion 333. The protrusion accommodating unit 423 has a length along the axial direction of the hinge pivot 310. The protrusion accommodating unit 423 has preferably but not necessarily a spiral shape along the axial direction of the hinge pivot 310 substantially matching that of the rocking protrusion 333. Accordingly, the durability of the rocking protrusion 333 and the protrusion accommodating unit 423 can be improved by the matching of the protrusions 333 and 423 as the forces applied are distributed long the length of the protrusion. In alterative embodiments, the protrusion accommodating unit 423 may have a rectilinear shape along the axial direction of the hinge pivot 310 depending on the shape of the rocking protrusion 333.

The protrusion accommodating unit 423 may be formed with an inclination surface 425 along a transverse direction to a lengthwise direction in a manner similar to that of rocking protrusion 333. Accordingly, coupling and withdrawal operation of the protrusion accommodating unit 423 and the rocking protrusion 333 can be smooth.

The conic sleeve 400 may further include a second lever 430 coupling the sleeve main body 410 to the display unit 120. The second lever 430 may be coupled to the display unit 120 by various coupling methods such as an insertion coupling, a screw coupling, a pin coupling, a rivet coupling, etc. Here, the sleeve main body 410 is formed with a protrusion insertion unit 415. The second lever 430 is formed with a coupling protrusion 435 inserted to the protrusion insertion unit 415 of the sleeve main body 410. The second lever 430 is coupled to the conic sleeve 400 by the coupling of the coupling protrusion 435 and the protrusion insertion unit 415.

The coupling protrusion 435 has preferably but not necessarily a non-circular sectional shape to prevent the conic sleeve 400 from rotating idly with respect to the second lever 430. Here, the protrusion insertion unit 415 has a shape that is shape-fitting-coupled with coupling protrusion 435 on lever 430.

In the present exemplary embodiment, it is described that the protrusion insertion unit 435 is provided to the conic sleeve 400 and the coupling protrusion 415 is formed on the second lever 430. However, it would be recognized by those skilled in the art that alternatively, the coupling protrusion may be provided to the conic sleeve 400 and the protrusion insertion unit may be formed to the second lever 430.

In the present exemplary embodiment, the conic sleeve 400 and the second lever 430 are exemplarily described to be provided by separate members to be coupled to each other by the coupling of the coupling protrusion 435 and the protrusion insertion unit 415. However, it would be understood that the invention claimed is not limited to the illustrated embodiment and it would be recognized that the conic sleeve 400 and the second lever 430 may be formed integrally (not shown).

In the present exemplary embodiment, the hinge unit 200 may further include an elastic member 500 disposed on the hinge pivot 310 and elastically pressing the conic sleeve 400 toward the conic shaft 300. In the present exemplary embodiment, the elastic member 500 is formed with a through hole through which the hinge pivot 310 passes, and is provided by a leaf spring having a curved surface. Here, the elastic member 500 may be provided in plural so that a concave surface thereof can be disposed to face each other or back to back (as shown). Alternatively, the elastic member 500 may be provided by a coil spring surrounding an outer surface of the hinge pivot 310 (not shown).

The hinge pivot 310 may be disposed with an elastic support unit 510 supporting and retaining the elastic member 500 onto the conic shaft 300.

Figure 5:
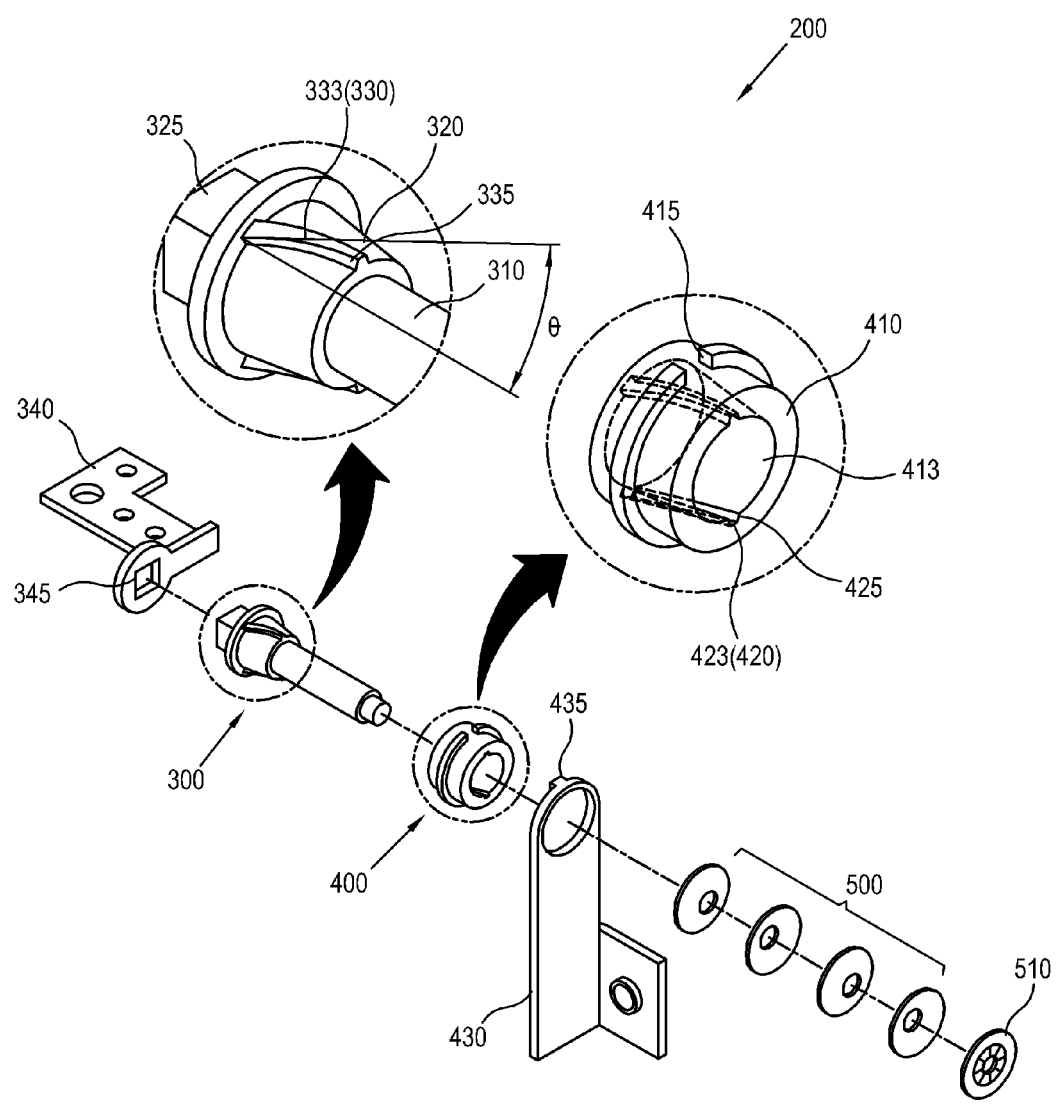
Figure 6:
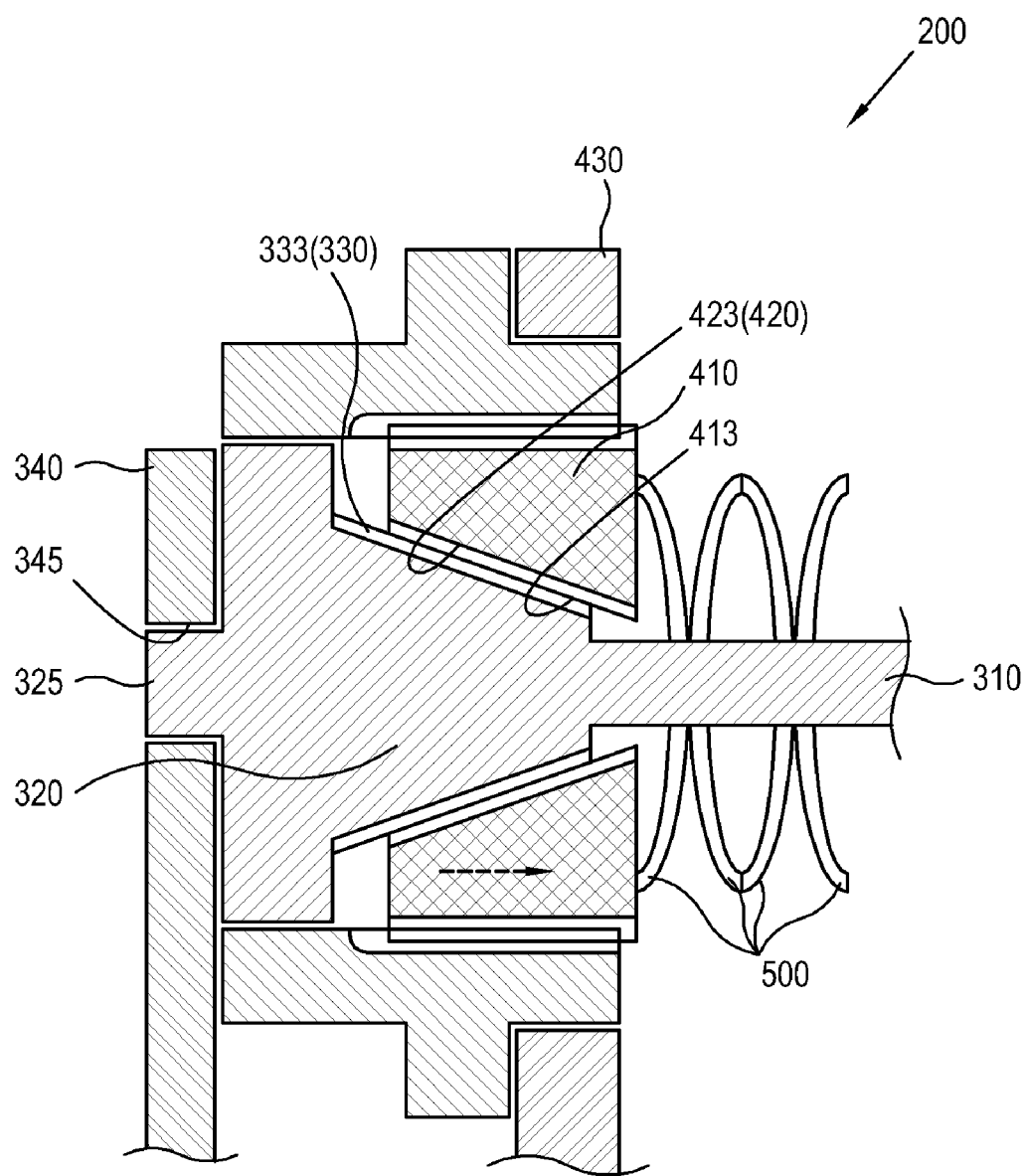
FIGS. 6 and 7 are sectional views illustrating operation states of the hinge unit according to the exemplary embodiment.
Figure 7:
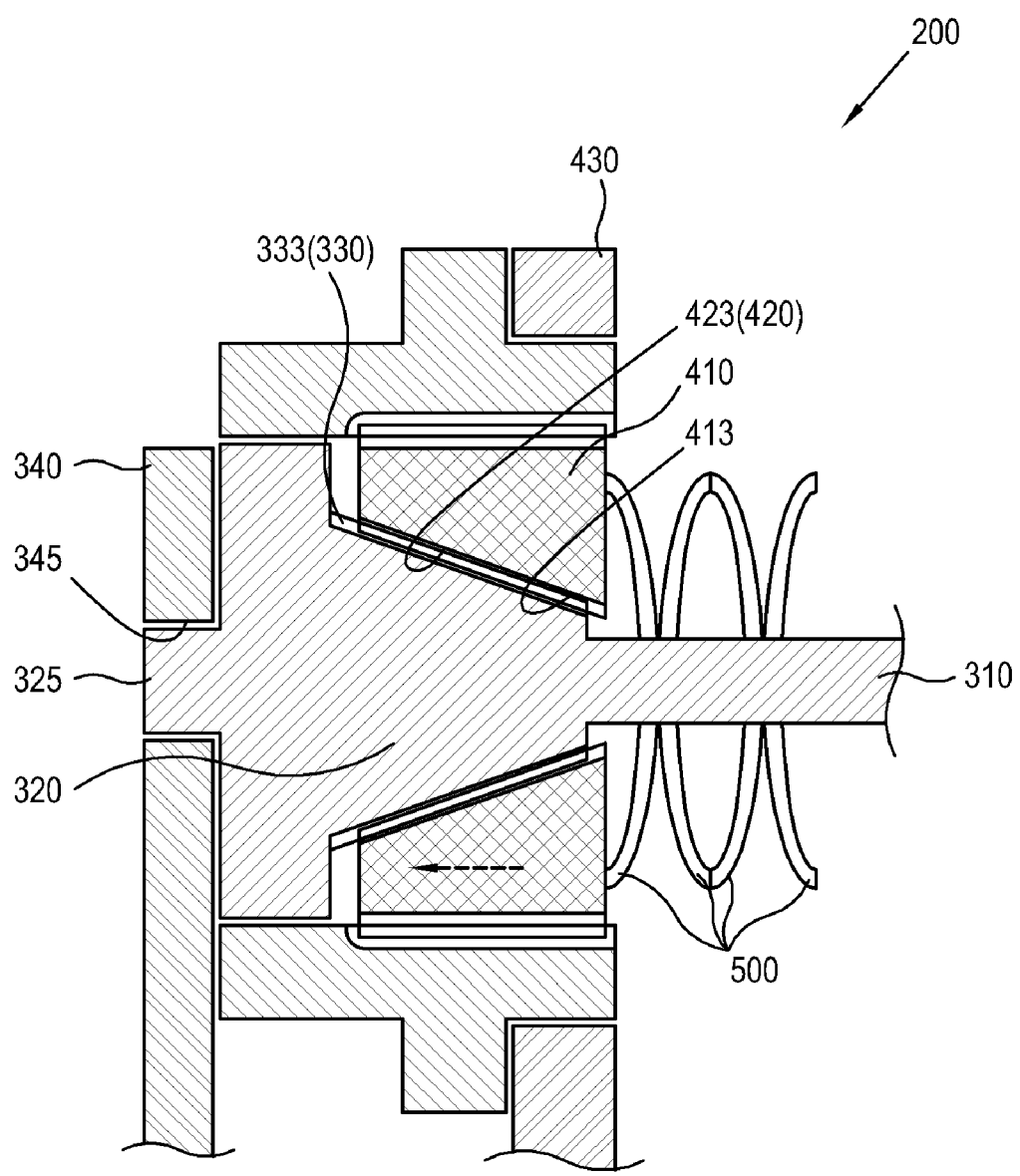

Referring to FIGS. 6 and 7, there is illustrated operation of the hinge unit 200 in accordance with the principles of the invention. In FIG. 6, the protrusion accommodating unit 423 is extended from the rocking protrusion 333 as indicated by the directional arrow facing toward the right. In this operational state the protrusion accommodating unit 423 applies a force to the rocking protrusion 333 in a first direction. In FIG. 7, the protrusion accommodating unit 423 is extended into the rocking protrusion 333 as indicated by the directional arrow facing toward the left. In this operational state the protrusion accommodating unit 423 applies a force to the rocking protrusion 333 in a second direction. This second direction may cause the hinge unit 200 to separate the main body from the display screen. In the above present exemplary embodiment, as shown in FIG. 5, it is described that the first rocking unit 330 is provided as the rocking protrusion 333 protruding from the outer surface of the conic unit 320 and the second rocking unit 420 is provided as the protrusion accommodating unit 423 recessed within the inner surface of the conic accommodating unit 413.

Figure 8:
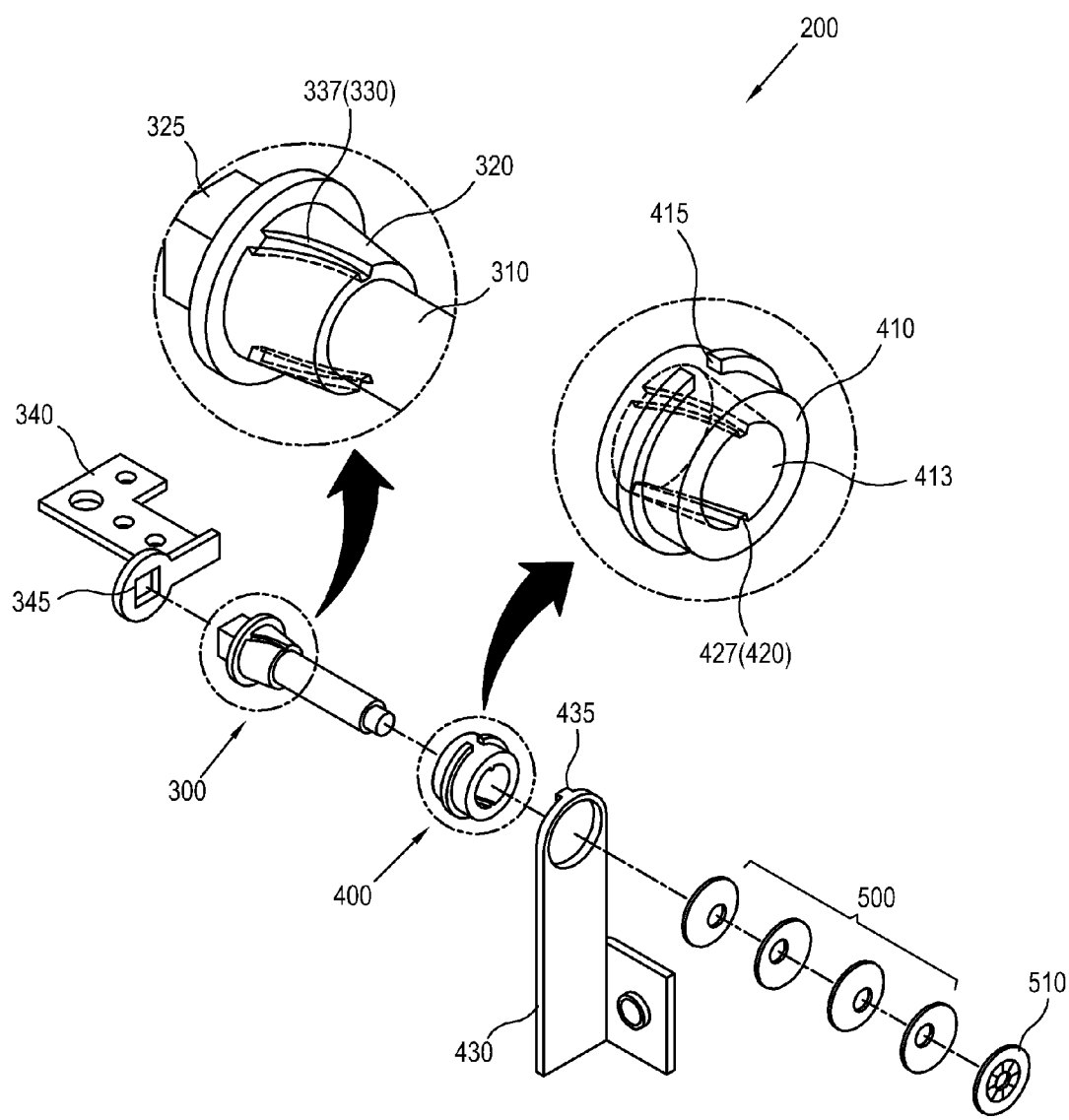
FIG. 8 is an exploded perspective view of a hinge unit according to another exemplary embodiment.

However, in a second exemplary embodiment of the invention as shown in FIG. 8, the first rocking unit 330 may be provided as a protrusion accommodating unit 337 recessed from an outer surface of the conic unit 320 and the second rocking unit 420 may be provided as a rocking protrusion 427 protruding from an inner surface of the conic accommodating unit 413.

As described above, according to the present exemplary embodiment, the hinge unit 200 is provided by the configurations of the conic shaft 300 and the conic sleeve 400, thereby reducing a component number, and reducing manufacturing costs.

Also, the conic unit 320 and the conic accommodating unit 413 relatively rotating are provided to have a truncated cone shape to disperse an operation force depending on the rotation of the conic shaft 300 and the conic sleeve 400, thereby distributing abrasion resistance of the rocking protrusions 333 and 427 and the protrusion accommodating units 423 and 337 over the length of the protrusions.

Also, the rocking protrusions 333 and 427 and the protrusion accommodating units 423 and 337 are provided in a spiral shape along an axial direction of the hinge pivot 310 to enlarge a contact area of the rocking protrusions 333 and 427 and the protrusion accommodating units 423 and 337 to disperse an operation force. Accordingly, an improvement in abrasion resistance is achieved during a coupling, or a withdrawing of the rocking protrusions 333 and 427 and the protrusion accommodating units 423 and 337.

Also, the inclination surfaces 335 and 425 are formed along a direction transverse to a lengthwise direction of the rocking protrusions 333 and 427 and the protrusion accommodating units 423 and 337, thereby furthering smoothing a relative rotation of the conic shaft 300 and the conic sleeve 400.

As described above, the present exemplary embodiment can provide a hinge unit and a portable computer having the same reducing a number of components to reduce manufacturing costs, and improve an abrasion resistance.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A hinge unit which couples a first member and a second member, the hinge unit comprising:
    a conic shaft which is coupled to the first member, and comprises a hinge pivot, a conic unit of a truncated cone shape, the radius of which is extended in an end area of the hinge pivot, and a first rocking unit formed to an outer surface of the conic unit; and
    a conic sleeve which is coupled to the second member, and comprises a sleeve main body formed with a conic accommodating unit having a shape corresponding to the conic unit in an inner part of the conic sleeve, and a second rocking unit formed on an inner surface of the conic accommodating unit to be coupled with the first rocking unit.

2. The hinge unit according to claim 1, wherein the first rocking unit is provided as a rocking protrusion protruding from an outer surface of the conic unit, and
    the second rocking unit is provided as a protrusion accommodating unit formed to an inner surface of the conic accommodating unit to accommodate the rocking protrusion.

3. The hinge unit according to claim 2, wherein the rocking protrusion and the protrusion accommodating unit are formed along an axial direction of the hinge pivot.

4. The hinge unit according to claim 3, wherein the rocking protrusion and the protrusion accommodating unit have a spiral shape along the axial direction of the hinge pivot.

5. The hinge unit according to claim 4, further comprising an elastic member which is disposed on the hinge pivot, and elastically presses the conic sleeve toward the conic shaft.

6. The hinge unit according to claim 5, wherein the rocking protrusion has an angle of the range of 5 to 45 degrees with respect to the axial direction of the hinge pivot.

7. The hinge unit according to claim 6, wherein the rocking protrusion includes at least one protrusion and the protrusion accommodating unit provides an associated protrusion accommodation along a radius direction of the hinge pivot.

8. The hinge unit according to claim 4, wherein at least one of the rocking protrusion and the protrusion accommodating unit is formed with an inclination surface along a transverse direction to a lengthwise direction thereof.

9. The hinge unit according to claim 4, wherein the hinge pivot, the conic unit and the first rocking unit are integrally formed.

10. The hinge unit according to claim 1, wherein the second rocking unit is provided as a rocking protrusion protruding from an inner surface of the conic accommodating unit, and
    the first rocking unit is provided as a protrusion accommodating unit formed to an outer surface of the conic unit to accommodate the rocking protrusion.

11. A portable computer which comprises a computer main body unit, a display unit, and a hinge unit coupling the display unit to the computer main body unit, the hinge unit comprising:
- a conic shaft which is coupled to one of the computer main body unit and the display unit, and comprises a hinge pivot, a conic unit of a truncated cone shape, the radius of which is extended in an end area of the hinge pivot, and a first rocking unit formed to an outer surface of the conic unit; and
- a conic sleeve which is coupled to the other of the computer main body unit and the display unit, and comprises a conic accommodating unit having a shape corresponding to the conic unit, and a second rocking unit formed to an inner surface of the conic sleeve to be coupled with the first rocking unit.

12. The portable computer according to claim 11, wherein the first rocking unit is provided as a rocking protrusion protruding from an outer surface of the conic unit, and
- the second rocking unit is provided as a protrusion accommodating unit formed within an inner surface of the conic accommodating unit to accommodate the rocking protrusion.

13. The portable computer according to claim 12, wherein the rocking protrusion and the protrusion accommodating unit are formed along an axial direction of the hinge pivot.

14. The portable computer according to claim 13, wherein the rocking protrusion and the protrusion accommodating unit have a spiral shape along the axial direction of the hinge pivot.

15. The portable computer according to claim 14, further comprising an elastic member which is disposed to the hinge pivot, and elastically presses the conic sleeve toward the conic shaft.

16. The portable computer according to claim 15, wherein the rocking protrusion has an angle in the range of 5 to 45 degrees with respect to the axial direction of the hinge pivot.

17. The portable computer according to claim 16, wherein at least one rocking protrusion and a corresponding protrusion accommodating the at least one rocking protrusion is provided along a radius direction of the hinge pivot.

18. The portable computer according to claim 14, wherein at least one of the rocking protrusion and the protrusion accommodating unit is formed with an inclination surface along a transverse direction to a lengthwise direction thereof.

19. The portable computer according to claim 14, wherein the hinge pivot, the conic unit and the first rocking unit are integrally formed.

20. The portable computer according to claim 11, wherein the second rocking unit is provided as a rocking protrusion protruding from an inner surface of the conic accommodating unit, and
- the first rocking unit is provided as a protrusion accommodating unit formed within an outer surface of the conic unit to accommodate the rocking protrusion.

* * * * *